J. H. SAILER.
WIRE REELING AND UNREELING DEVICE.
APPLICATION FILED MAR. 9, 1914.
1,126,090.
Patented Jan. 26, 1915.
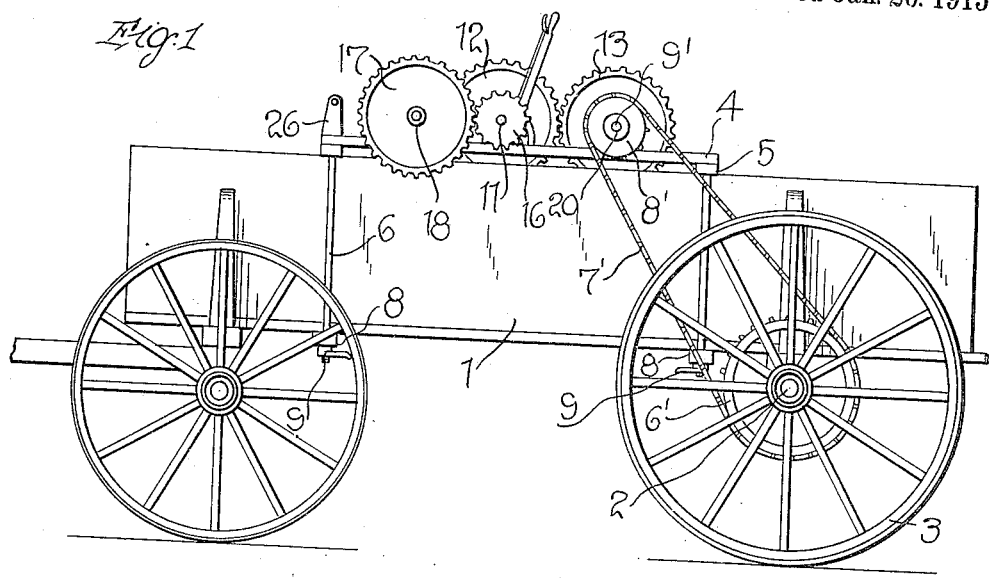
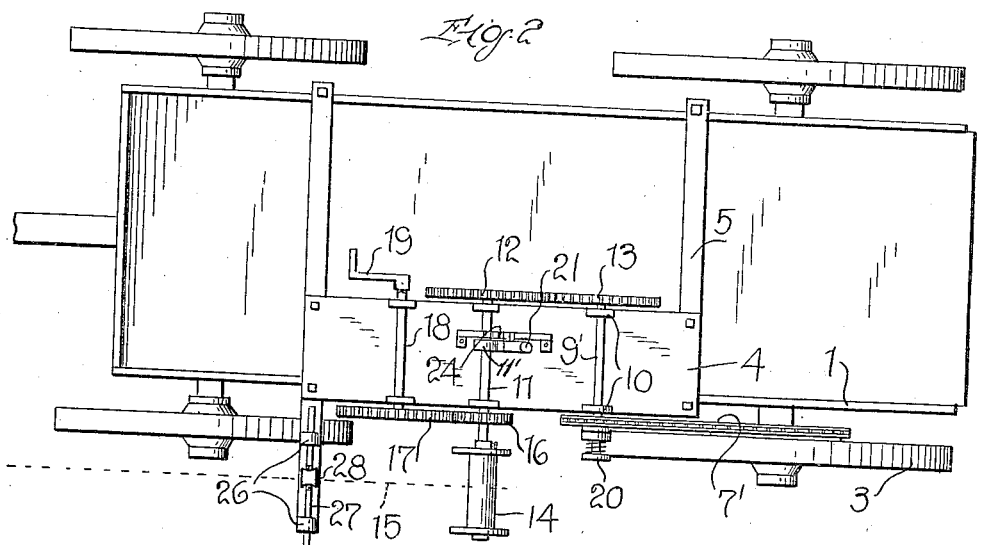
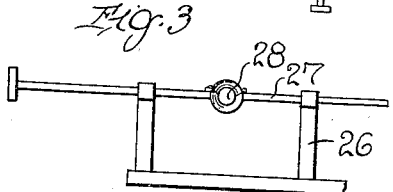
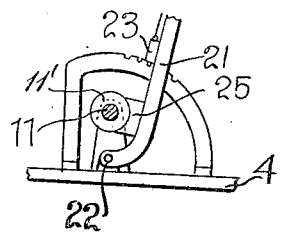
Witnesses
Robert M. Sutphen
A. L. Hind
Inventor
J. H. SAILER
By Watson E. Coleman
Attorney

UNITED STATES PATENT OFFICE.

JOHN H. SAILER, OF GENEVA, IOWA.

WIRE REELING AND UNREELING DEVICE.

1,126,090.  Specification of Letters Patent.  Patented Jan. 26, 1915.

Application filed March 9, 1914. Serial No. 823,629.

*To all whom it may concern:*

Be it known that I, JOHN H. SAILER, a citizen of the United States, residing at Geneva, in the county of Franklin and State of Iowa, have invented certain new and useful Improvements in Wire Reeling and Unreeling Devices, of which the following is a specification, reference being had to the accompanying drawings.

This invention relates to new and useful improvements in fence wire reeling machines and more particularly to a wire reeling and unreeling machine which can be readily applied to the ordinary farm wagon, the main object of the invention being the provision of a reeling and unreeling device which can be readily applied to a farm wagon and actuated by the rotation of the rear axle of the wagon.

Another object of the invention is the provision of an attachment of this character which will possess advantages in points of efficiency and durability, is inexpensive to manufacture and, at the same time, is simple in construction and operation.

With these and other objects in view, the invention consists in the novel features of construction, combination and arrangement of parts as will be hereinafter referred to and more particularly pointed out in the specification and claim.

In the accompanying drawing forming a part of this application, Figure 1 is a side elevation of a wagon illustrating the application of my improved fence wire reeling machine applied thereto. Fig. 2 is a top plan view. Fig. 3 is a front elevation of the wire guide; and Fig. 4 is a side elevation of the locking device.

In carrying out my invention, a wagon body 1 is provided which is supported upon the axles 2 having the wheels 3 upon each end thereof.

Removably mounted upon the upper edge of one of the side walls of the wagon box, is the base member 4, said base member being securely retained in position by means of the supporting bars 5, said bars having their ends resting upon the upper edge of the wagon box and retained in position by means of the vertically disposed rods 6, the upper ends of said rods being provided with head members, while the lower ends thereof extend through the transverse bar 8 and are threaded to receive the removable screw members 9, which are threaded upon the lower ends of the rods to retain the same in their effective positions. From this, it will be apparent that my improved wire reeling machine may be quickly applied to the wagon box or removed therefrom.

Mounted upon the rear axle of the wagon, is a sprocket wheel 6' upon which a sprocket chain 7' is mounted, said chain being connected with the sprocket 8' upon the outer end of the main shaft 9'. The main shaft 9' is mounted within suitable bearings 10 secured to the upper face of the base member 4, so that upon forward movement of the wagon, the sprocket wheel 8' will be rotated, which in turn will impart rotary movement to the main shaft 9'.

Mounted upon the base member 4 and arranged in spaced relation with the main shaft 9', is the spindle shaft 11, upon the inner end of which is mounted a gear 12 adapted to mesh with a similar gear 13, upon the inner end of the shaft 9', whereby rotary movement may be readily imparted to the rotary shaft 11. The spindle shaft 11 extends outwardly beyond the side of the wagon box a sufficient distance and adapted to be mounted thereon, is a reel 14, upon which the wire 15 is adapted to be wound or unwound therefrom.

Mounted upon the spindle shaft 11, and arranged beyond the outer edge of the base board 4, is a gear 16 which is adapted to mesh with a larger gear 17 mounted upon the outer end of the crank shaft 18, said crank shaft extending inwardly into the wagon box and is provided with a handle member 19 whereby the same may be readily rotated to impart a rotary movement to the spindle shaft 11. It will be apparent that the crank shaft 18 is to be used in taking up the slack or winding the wire, while the wagon is turning a curve.

The sprocket 8' is provided with a spring actuated friction clutch 20 which is adapted to provide a friction drive between the positively driven sprocket wheel 8' and the main shaft 9' to prevent the spindle shaft 11 from being driven too fast. It will be apparent that if it is desired to stop the rotation of the spindle shaft 11, this may be done and still permit the rotation of the sprockets 6' and 8'.

In order to prevent the reel from rotating too rapidly, I provide a friction brake comprising a lever 21 which is pivotally secured, as shown at 22, and extends upwardly from the base member. Movably mounted thereon is a spring actuated pawl 23 which is adapted to engage with the teeth on the rack bar 24.

Secured to the lower curved portion of the lever, is a brake block 25 adapted to engage a collar 11' secured upon the spindle shaft 11 by means of which a braking force may be applied to prevent the wire from unrolling too fast from the reel 14.

It will be noted that the base member 4 is retained in its horizontal position by means of the supporting bar 5, and it will be noted that one end of one of the rods projects beyond the side wall of the wagon box and mounted thereon, is a frame 26. Extending transversely across the frame 26, is the supporting rod 27 in the center of which is formed a guide 28, through which the wire 15 passes before being wound upon the reel 14 or after being unwound therefrom. It will be apparent that the base member 4 which supports the various gears and shafts of my improved machine can be quickly and readily attached upon the upper longitudinal edge of one of the sides of the wagon box in a very short space of time or removed therefrom.

From the above description taken in connection with the accompanying drawing, it will be readily apparent that I have provided a simple and durable wire reeling and unreeling device wherein the various operative parts thereof are mounted upon a removable base board adapted to be removably secured to the upper longitudinal edge of one of the side boards of the wagon box and the power obtained to move the wagon will be conveyed from the rear axle of the wagon, through the medium of the sprocket chains 7'. The device, as herein shown and described, is extremely simple in construction and can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the appended claim.

Having thus described this invention, what I claim is:—

The combination with a vehicle and its supporting axles, of a base member mounted upon the vehicle, a main shaft extended transversely across the base member, a sprocket upon one end of the main shaft, a gear upon the other end, means for connecting said sprocket with the rear axle of the vehicle, a spindle shaft arranged in spaced relation with the main shaft, a gear mounted upon each end thereof, one of said gears being adapted to engage the gear on the inner end of the main shaft, a drum mounted upon the extreme outer end of the spindle shaft, a crank shaft, a gear upon the outer end thereof adapted to mesh with the gear upon the outer end of the spindle shaft, a clutch member carried by the sprocket wheel, a spring clutch carried by the main shaft and adapted to normally engage the clutch on the sprocket, a sleeve mounted upon the spindle shaft, a pivoted braking lever carried by the base, a bearing block carried by the lever and adapted for engagement with the sleeve on the spindle shaft to retard the rotary movement of said shafts, whereby the reel may be rotated independent of the first mentioned sprocket.

In testimony whereof I hereunto affix my signature in the presence of two witnesses.

JOHN H. SAILER.

Witnesses:
JACOB SAILER, Jr.,
B. D. HUNT.

Copies of this patent may be obtained for five cents each, by addressing the "Commissioner of Patents, Washington, D. C."